Oct. 20, 1953

S. F. LYBARGER 2,656,421

WEARABLE HEARING AID WITH INDUCTIVE PICKUP FOR TELEPHONE RECEPTION

Filed Oct. 21, 1950

2 Sheets-Sheet 1

INVENTOR.

Samuel F. Lybarger

BY

Brown, Critchlow Flick & Peckham his Attorneys.

INVENTOR.
Samuel F. Lybarger
BY
Brown, Critchlow, Flick & Peckham
his attorneys.

Patented Oct. 20, 1953

2,656,421

UNITED STATES PATENT OFFICE 2,656,421

WEARABLE HEARING AID WITH INDUCTIVE PICKUP FOR TELEPHONE RECEPTION

Samuel F. Lybarger, Canonsburg, Pa., assignor, by mesne assignments, to E. A. Myers & Sons, Inc., Mount Lebanon, Pittsburgh, Pa., a corporation of Pennsylvania Application October 21, 1950, Serial No. 191,432

8 Claims. (Cl. 179—107)

Figures 1, 2:
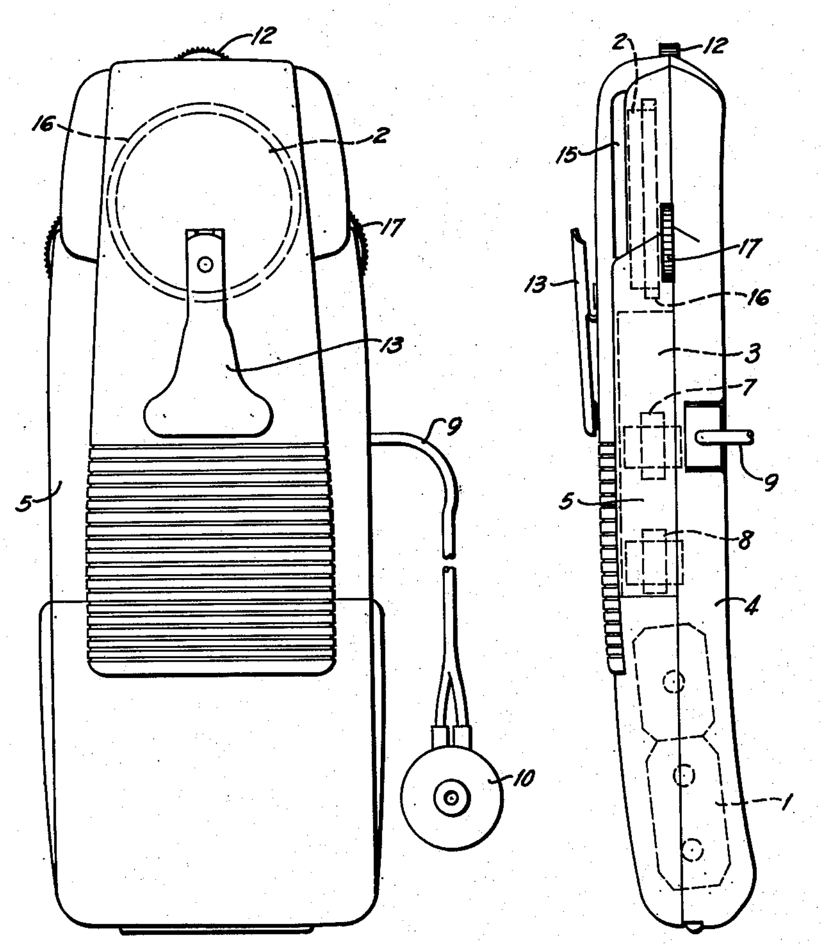

This invention relates to wearable hearing aids, and more particularly to sound-receiving units therein. This application is a continuation-in-part of my copending application Serial No. 750,480, filed May 26, 1947, for Wearable Hearing Aid With Inductive Pickup For Telephone Reception, now Patent No. 2,530,621.

In the past it has been the custom for a hard of hearing person, while listening to a telephone, to couple the telephone receiver to his hearing aid microphone acoustically by placing the face of the receiver over the grille slots in the face of the hearing aid case. There are may disadvantages to this. In addition to having to remove the case from the pocket or other place of concealment, it is seldom that the face of the hearing aid case fits the adjoining edge of the usual telephone receiver. As a result, poor acoustic coupling is secured. This causes serious and unpredictable distortion and, of course, permits extraneous noises and sounds to enter the microphone where they interfere with the telephone conversation. In addition to the distortion caused by poor acoustic coupling, the acoustic frequency distortion of both the hearing aid microphone and the telephone receiver enter the system, thereby reducing the quality of the transmitted speech. Another very serious difficulty is due to the fact that the listener seldom can hold the telephone receiver against the face of his hearing aid firmly and steadily enough to avoid scraping or clacking sounds that are greatly amplified by the hearing aid because they are produced so close to the microphone.

It is among the objects of this invention to provide a wearable hearing aid which is highly satisfactory for listening to a telephone without moving the hearing aid from the usual wearing position on the person, which completely eliminates extraneous sounds while the wearer is carrying on a telephone conversation, which eliminates all clacking and scraping noises due to holding the telephone receiver against the hearing aid case, which eliminates the combined acoustic distortion of the telephone receiver and microphone diaphragm as well as distortion caused by resonance and acoustic effects in the cavity between them, which permits pickup through heavy clothing without actual contact between the telephone receiver and the hearing aid, which gives any desired ratio of telephone signal to direct voice pickup while talking on the telephone, which will retain the correct frequency-amplification characteristics for either telephone or direct speech pickup, which materially reduces the transmission of case vibrations to the microphone, which is compact, and which is easy to service.

In accordance with this invention the hearing aid is the type which is worn on the person, such as in a pocket, and includes the usual microphone and receiver. Although in some cases the microphone itself may furnish sufficient amplification, generally an amplifier is provided for amplifying the sounds picked up by the microphone. The hearing aid also includes an inductive pickup coil which is adapted to respond to or pick up the electromagnetic waves from the audio-frequency magnetic field of an adjacent sound reproducing instrument, such as a radio or telephone. For the sake of brevity, but without any idea of limiting the invention thereto, most of the claims herein will refer to a telephone receiver. The pickup coil is electrically connected to the amplifier so that inductive pickup from the telephone receiver can be effected. The coil can be left in circuit all of the time, but it is preferable to provide an electric switch for cutting it out of the circuit when it is not being used to listen to a telephone. Although a greater or lesser degree of acoustic pickup can be combined with the inductive pickup from a telephone receiver by leaving the microphone in the circuit, it generally is preferred to switch the microphone out of the circuit at the same time the pickup coil is switched in. In such a case, the only sounds that the hearing aid transmits to the ear are those produced by the electromagnetic waves emanating from the telephone receiver. The sound waves produced by the receiver diaphragm have no effect on the hearing aid because the latter's microphone is not in circuit at that time. Thus, all frequency distortion and other noises are eliminated. The response characteristics of the different elements of the hearing aid can be made such that the over-all frequency response from a speaker's mouth to the eardrum of the hard of hearing person is substantially the same whether the speech transmission to the hearing aid is direct from the mouth or through the medium of a telephone. The pickup coil is supported by the microphone, either outside of it or inside of it. The microphone and pickup coil form a sound-receiving unit.

Figure 3:
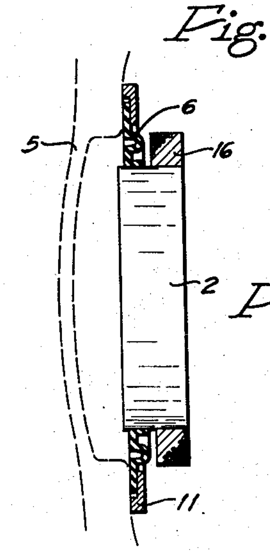
Figure 5:
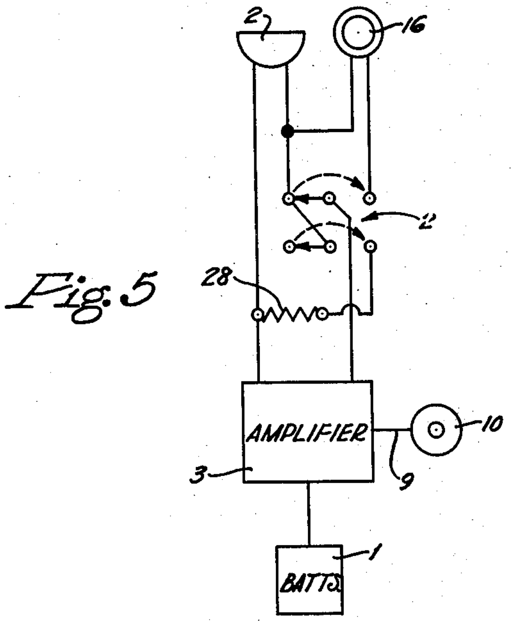
Figure 4:
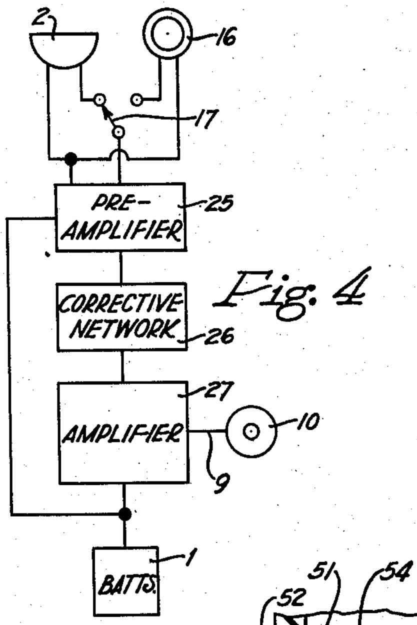
Figure 6:
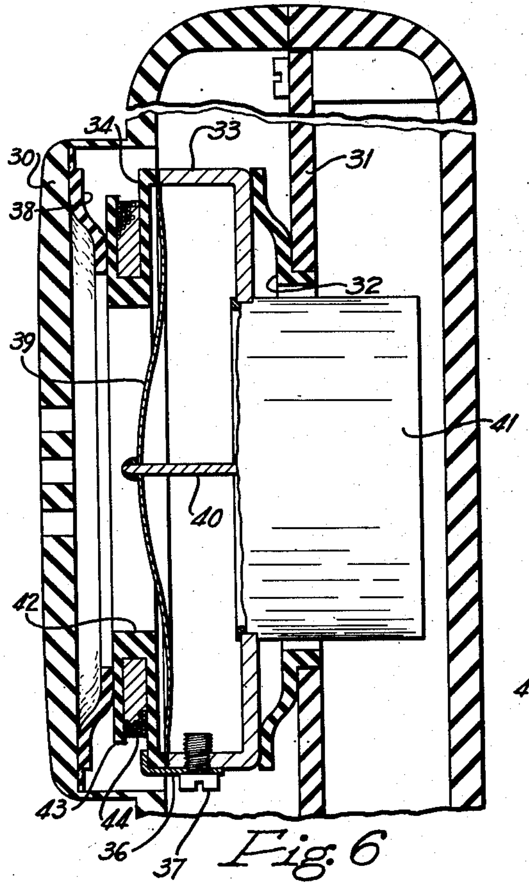
Figure 7:
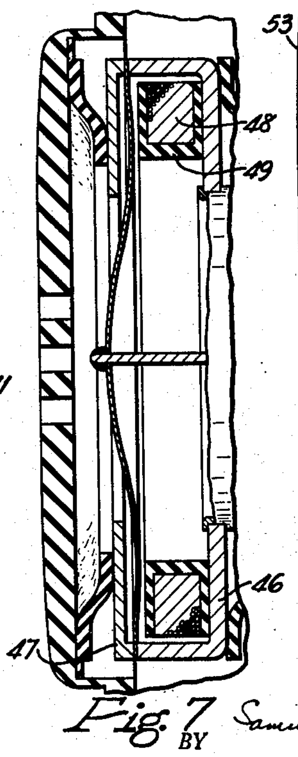
Figure 8:
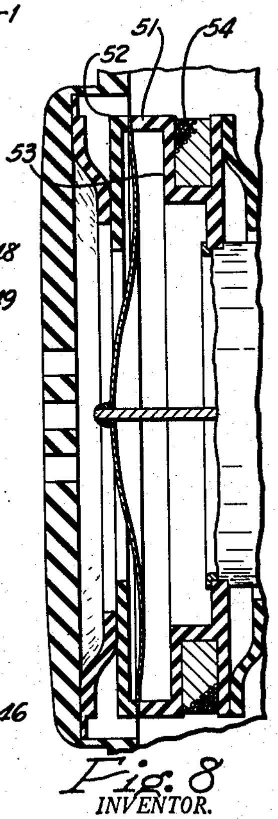

The invention is illustrated in the accompanying drawings, in which Fig. 1 is a front view of my hearing aid; Fig. 2 is a side view of the case; Fig. 3 is an enlarged side view of the microphone, with the microphone support and the supporting pickup coil shown in section; Fig. 4 is a diagrammatic view showing the different elements of my hearing aid wired together; Fig. 5 is a view similar to the preceding figure, but with no means for switching the microphone out of the circuit; Fig. 6 is a horizontal section through a modified case, showing a modified sound-receiving unit therein; and Figs. 7 and 8 are views similar to Fig. 6, showing two further embodiments of the invention.

Referring to Figs. 1 and 2 of the drawings, the hearing aid shown is the type in which the batteries 1 are mounted in a compartment in the lower part of the same case that contains the microphone 2 and amplifying unit 3. However, this invention is not limited to such a case, as it is equally applicable to a shorter case with the battery unit separated from it. The case has a recessed back portion 4, by which most of the elements are supported, and a deep cover 5 that encloses and conceals those elements. The microphone is spaced from the front wall of the case, as shown in Fig. 3, from which it can be resiliently supported by a flexible rubber ring 6 tightly encircling the microphone and fastened to the case cover in any suitable manner, such as by a clamping ring 11. The microphone is electrically connected to the amplifying unit in the usual way (not shown). The amplifier preferably is of the vacuum tube type and may include an input transformer 7 and an output transformer 8. An electric cord 9 extends from the amplifier through the side of the case and is connected to an air conduction receiver 10 that is worn in the ear, or to a bone conduction receiver. The amount of amplification desired is controlled by the volume control wheel 12 projecting through through the top of the case. Mounted on the front of the case is a spring clip 13 for attaching the case to the clothing, such as to the front of a pocket in which the case is carried.

The hearing aid disclosed thus far is more or less conventional and includes, in addition to the elements described, the usual vacuum tubes, condensers and other elements which make up the amplifier and corrective network in such a hearing aid. However, the front or cover of the case shown in Figs. 1 and 2 need not be conventional, but may have a solid front face without the usual front openings for sound. In such a construction the central portion of the cover projects ahead of the rest of it, to which it is connected by narrow side walls. Near the top of the case these side walls are provided with vertical slots 15 through which sound can enter the case. This arrangement substantially eliminates the noise that used to occur due to clothing rubbing across the grill slots in front of the case and also due to the resonating chamber formed between the clothing and the microphone diaphragm. When the present case is carried in a pocket the material of the pocket does not scrape across the side slots or form a resonating chamber therewith. Nevertheless, the pocket being open at the top and down beside the side slots, sound is free to enter the slots. Another important advantage of having only side slots is that this hearing aid is fairly directional at high frequencies, thus reducing the ratio of noise to signal and also giving the user a better sense of direction than might otherwise be the case.

With such a case it would not be practicable to hold a telephone receiver against the front of the case because there are no sound openings there, and it would be even less practicable to leave the case in the pocket and press the receiver against the cloth between it and the case in order to provide acoustic coupling. For the reasons pointed out at the beginning of this specification, acoustic connections between a telephone receiver and a hearing aid are not satisfactory anyway. Therefore, another feature of this invention is that such acoustic connections can be avoided and yet reception from a telephone can be greatly improved. Accordingly, an inductive pickup coil 16 is mounted in the case, where it is supported by the microphone, preferably concentrically therewith, to form a sound-receiving unit that requires but little space. As shown in Fig. 3, the coil may be mounted on the cylindrical side wall of the microphone. In addition to placing the coil close to the axis of output transformer 8, this arrangement also benefits the microphone because it increases its weight and inertia and thereby makes its resilient mounting 6 more effective for preventing case vibrations from reaching the microphone and causing disturbing noises. This coil normally is not in circuit with the rest of the hearing aid, but it can be switched into the circuit, as shown in Fig. 4, by means of an electric switch 17 which preferably simultaneously disconnects the microphone from the circuit.

The pickup coil is simply a number of turns of insulated wire, the number depending upon the circuit into which the coil is connected. If it operates into a low impedance circuit, for example the primary of a step-up transformer, it need have only a relatively small number of turns. If the coil operates into the grid of the first tube of the amplifier, then it must be composed of a considerable number of turns of smaller wire. The coil will respond to the audio-frequency magnetic field of an adjacent telephone receiver by picking up the electro-magnetic waves emanating from the telephone receiver coils. The pickup coil should not be so small as not to have enough magnetic lines of force flowing through it from the audio-frequency field of the telephone receiver to give a satisfactory voltage. It has been found that a coil of about ¾ inch inside diameter and $1\frac{3}{16}$ inches outside diameter with a thickness of about $\frac{1}{16}$ is very satisfactory. When the signal is fed through a 70 to 7700 turns ratio input transformer, a coil having about 100 turns is very satisfactory.

The location of sound slots in the case, or even their existence, has no effect on the operation of the pickup coil. Also, while the coil is in circuit, it makes no difference if the telephone receiver or the clothing scrapes against the case, because acoustic sound waves are not picked up by the pickup coil. It is unnecessary to remove the case from the pocket because the telephone receiver can be held close to or against the pocket and the electromagnetic waves will pass through the clothing and into the case without difficulty.

It is not necessary, however, that the telephone receiver be held in any exact position relative to the pickup coil, for with a high-gain-amplifier type of hearing aid there is enough pickup at a distance of one or one and one-half inches from the pickup coil to give adequate speech intensity for most hard of hearing people. It also has been found that there are many places around the telephone receiver where good performance can be obtained. For example, good pickup results even when the back or heel of the telephone receiver is held near the pickup coil. The position of best pickup depends on the orientation of the parts inside the particular telephone. Since all of the pickup results from the inductive coupling between the pickup coil and the audio-frequency magnetic field around the telephone receiver, it is obvious that no mechanical contact is required.

The volume adjustment required for the telephone pickup can, in general, be made about the same as for average speech pickup for the individual. If further volume adjustment is desirable, it can be made by turning the control wheel 12 or by moving the telephone receiver toward or away from the pickup coil. However, small variations in the position of the telephone receiver do not make very much difference in sound intensity, which is a distinct advantage in that the user does not have to be so particular to hold the receiver in an exact location relative to the pickup coil while he is telephoning.

The usual modern hearing aid is provided with a corrective network to give it tailor-made response characteristics with frequency. Such networks are well known to those skilled in this art. Also, the microphone has certain response characteristics and the receiver has certain response characteristics, all of which combine to give the hearing aid the desired over-all response. Fig. 4 is a diagram of a system that will accomplish the desired results. The amplifier is shown divided into three parts; the first stage 25 of the amplifier, the corrective network 26 used in the amplifier, and the output portion 27 of the amplifier. When using the telephone pickup certain changes in frequency response occur as compared to listening directly to a telephone receiver or to a speaker. To take care of that situation, my pickup coil should have such response characteristics that the difference between the response characteristics of the microphone and those of the coil will be such that the over-all frequency response from a speaker's mouth to the eardrum of the hard of hearing person will be substantially the same when the pickup coil is in circuit as when the microphone is in circuit and receiving speech directly.

In some cases it may be desirable not to cut the microphone out of the circuit entirely when the pickup coil is being used. A circuit by which this can be accomplished is shown in Fig. 5. It includes a shunting resistor 28 which reduces the output of the microphone while the pickup coil is being used. A switch 29 is used to simultaneously switch the pickup coil and resistor into and out of the circuit. With this system a person listening to a telephone can also carry on a side conversation with someone near him by direct acoustic pickup through the microphone, and yet not be bothered by external noises in the vicinity of the speaker.

In the modification of the invention shown in Fig. 6, the front of the hearing aid case 30 is provided with the conventional sound openings. Screwed into the back of the case is a chassis plate 31 which, in addition to supporting the other elements (not shown) that are in the case, supports the sound receiving unit. For this purpose the chassis plate is provided with an opening in which the hub of a flexible rubber ring 32 is inserted. The ring flares forward from the hub and is cemented to the back of a microphone housing 33. A cover 34 is clamped on the front of the housing by means of circumferentially-spaced clamps 36 and screws 37. The microphone, which is spaced from the front of the case, is prevented from becoming disconnected from the chassis plate by means of a second flexible rubber ring 38 that is cemented to the microphone cover and flares forward therefrom into engagement with the inner surface of the case. The microphone therefore is resiliently supported in the case by means of the two rubber rings. Between the cover of the microphone and its housing there is a diaphragm 39, preferably formed from aluminum foil which is dished to strengthen it. Inside of the housing there is a drive pin 40, the front end of which is secured to the center of the diaphragm. The rear end of the pin extends through an opening in the back of the housing and is connected to an electromagnetic generating system, by which the movements of the diaphragm are converted into electrical energy. The details of this generating system are not illustrated because they form no part of this invention. They are disclosed in my copending patent application Serial No. 794,146, filed December 27, 1947, now Patent No. 2,552,800. The generating system is mounted in a small cup 41 that has an open front end rigidly mounted in the back wall of the microphone housing.

The microphone cover 34, which preferably is made of an insulating material, extends radially inward in front of the diaphragm for a short distance and then extends forward as a short cylinder 42. The outer end of this cylinder has a radial flange 43 around it. Consequently, an annular recess is formed between the flange and the body of the cover parallel to it. Wound in this recess is an inductive pickup coil 44 which, like the one previously described, will respond to the audio-frequency magnetic field of an adjacent telephone receiver. Advantages of this arrangement are that the microphone cover serves as a form for the coil, and it is very easy to wind the coil in the cover recess. Like pickup coil 16, this coil also increases the inertia of the microphone.

The embodiment of the invention shown in Fig. 7 requires no change in the form of the microphone housing 46 and its cover 47, because the coil 48 is mounted inside of the microphone. Preferably, the coil is wound on a coil form 49 of insulating material, and the form is cemented to the back wall of the housing. This form has the same advantages as the embodiment shown in Fig. 6, and a further advantage that the sound-receiving unit can be made a little shorter.

In the modification shown in Fig. 8, the microphone housing 51, instead of its cover 52, is provided with a surrounding recess 53 in which an inductive pickup coil 54 is wound. The housing can conveniently be made of a molded plastic.

The sound-receiving units disclosed herein are easy to service because in each instance the microphone and coil are connected together so that both are removed from the case and replaced therein as a unit.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A wearable hearing aid wherein a microphone that is resiliently supported in a case to be worn by a hard of hearing person is normally electrically connected to an amplifier that is connected with a receiver, characterized by the fact that an inductive pickup coil which is adapted to be energized by the alternating magnetic field of an adjacent telephone receiver is supported in the case by means of the microphone to increase the weight and inertia of the microphone in order to reduce mechanical transmission of case vibrations to the microphone, and an electric switch is provided for electrically connecting said coil to the amplifier.

2. A wearable hearing aid wherein a microphone that is resiliently supported in a case to be worn by a hard of hearing person is electrically connected to an amplifier that is connected with a receiver, characterized by the fact that an inductive pickup coil which is adapted to be energized by the alternating magnetic field of an adjacent telephone receiver is supported in the case by means of the microphone coaxially of the latter to increase the weight and inertia of the microphone in order to reduce mechanical transmission of case vibrations to the microphone, and means are provided for electrically connecting the coil to the amplifier.

3. A wearable hearing aid wherein a microphone that is resiliently supported in a case to be worn by a hard of hearing person is electrically connected to an amplifier that is connected with a receiver, characterized by the fact that an inductive pickup coil which is adapted to be energized by the alternating magnetic field of an adjacent telephone receiver is located inside the case where it encircles the microphone and is supported thereby to increase the weight and inertia of the microphone in order to reduce mechanical transmission of case vibrations to the microphone, and means are provided for electrically connecting the coil to the amplifier.

4. A wearable hearing aid wherein a cylindrical microphone that is electrically connected with an amplifier and receiver has its front end connected by a resilient ring to the inside of a case to be worn by a hard of hearing person, characterized by the fact that an inductive pickup coil which is adapted to be connected to the amplifier and to be energized by the alternating magnetic field of an adjacent telephone receiver encircles the microphone behind said ring and is supported by the microphone to increase the weight and inertia of the microphone in order to reduce mechanical transmission of case vibrations through said ring to the microphone.

5. A sound-receiving unit for use in a wearable hearing aid case, said unit comprising a microphone, and an inductive pickup coil mounted inside of the microphone, said coil being adapted to respond to the audio-frequency magnetic field of an adjacent telephone receiver.

6. A sound-receiving unit for use in a wearable hearing aid case, said unit comprising a microphone having a wall provided with a recess extending around it, and an inductive pickup coil mounted in said recess, said coil being adapted to respond to the audio-frequency magnetic field of an adjacent telephone receiver.

7. A sound-receiving unit for use in a wearable hearing aid case, said unit comprising a microphone having a cover provided with a recess that extends around it and opens radially outward, and an inductive pickup coil mounted in said recess, said coil being adapted to respond to the audio-frequency magnetic field of an adjacent telephone receiver.

8. A sound-receiving unit for use in a wearable hearing aid case, said unit comprising a microphone having a front cover provided with a forwardly extending annular portion of reduced diameter terminating in an outwardly extending radial flange to form an annular recess, an inductive pickup coil disposed in said recess and adapted to respond to the audio-frequency magnetic field of a telephone receiver, and a resilient ring fastened to said cover flange and extending forward to engage the inside of the case.

SAMUEL F. LYBARGER.

References Cited in the file of this patent

UNITED STATES PATENTS

| Number | Name | Date |
|---|---|---|
| 1,110,228 | Plecher | Sept. 8, 1914 |
| 1,458,988 | Morehouse | June 19, 1923 |
| 2,304,339 | Cubert | Dec. 8, 1942 |
| 2,417,153 | Darr | Mar. 11, 1947 |
| 2,530,621 | Lybarger | Nov. 21, 1950 |

FOREIGN PATENTS

| Number | Country | Date |
|---|---|---|
| 495,171 | Great Britain | Nov. 8, 1938 |